United States Patent
Sethian et al.

(10) Patent No.: US 9,089,815 B2
(45) Date of Patent: Jul. 28, 2015

(54) CATALYST-FREE REMOVAL OF $NO_x$ FROM COMBUSTION EXHAUSTS USING INTENSE PULSED ELECTRON BEAMS

(71) Applicants: John D. Sethian, Burke, VA (US); Matthew Myers, Beltsville, MD (US); Mathew Wolford, Woodbridge, VA (US); Frank Hegeler, Vienna, VA (US)

(72) Inventors: John D. Sethian, Burke, VA (US); Matthew Myers, Beltsville, MD (US); Mathew Wolford, Woodbridge, VA (US); Frank Hegeler, Vienna, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 82 days.

(21) Appl. No.: 13/645,556

(22) Filed: Oct. 5, 2012

(65) Prior Publication Data
US 2013/0153404 A1 Jun. 20, 2013

Related U.S. Application Data

(60) Provisional application No. 61/570,869, filed on Dec. 15, 2011.

(51) Int. Cl.
*B01J 19/08* (2006.01)
*B01D 53/74* (2006.01)
*B01D 53/32* (2006.01)

(52) U.S. Cl.
CPC ............... *B01D 53/32* (2013.01); *B01J 19/085* (2013.01); *B01D 2257/404* (2013.01); *B01D 2259/812* (2013.01); *B01J 2219/0875* (2013.01)

(58) Field of Classification Search
CPC ............................... B01J 19/085; B01D 53/74
USPC ............. 204/157.46, 157.44, 157.3; 422/168
See application file for complete search history.

(56) References Cited

U.S. PATENT DOCUMENTS

| | | | | |
|---|---|---|---|---|
| 3,869,362 A | * | 3/1975 | Machi et al. | 204/157.46 |
| 3,925,670 A | * | 12/1975 | Farrell et al. | 250/400 |
| 4,882,020 A | * | 11/1989 | Maezawa et al. | 204/157.44 |
| 4,885,065 A | * | 12/1989 | Gilgenbach | 204/157.44 |
| 5,210,426 A | * | 5/1993 | Itoh et al. | 250/492.3 |

(Continued)

OTHER PUBLICATIONS

Ikegaki et al, "Flue Gas Treatment by Intense Pulsed Relativistic Electron Beam," Jpn. J. Appl. Phys. vol. 40 (2001) pp. 1104-1107, Part 1, No. 2B, Feb. 2011.*

(Continued)

*Primary Examiner* — Keith Hendricks
*Assistant Examiner* — Colleen M Raphael
(74) *Attorney, Agent, or Firm* — US Naval Research Laboratory; Joslyn Barritt

(57) ABSTRACT

A process and apparatus for removing $NO_x$ from exhaust gases produced by combustion-based energy sources. An array of high voltage pulsed electron beams are repetitively generated and transported through a thin foil into the exhaust gas containing $NO_x$. The electron beam deposits its energy into the gas and produces reactive radicals $N_2^+$, $N^+$, e, $N_2$ from the $NO_x$ in the gas. These radicals recombine through chemical reactions to produce benign by-products nitrogen $N_2$ and oxygen $O_2$ which are output into the atmosphere.

14 Claims, 4 Drawing Sheets

(56) References Cited

U.S. PATENT DOCUMENTS

| | | | |
|---|---|---|---|
| 5,693,195 A * | 12/1997 | Saito et al. | 204/157.44 |
| 5,695,616 A | 12/1997 | Helfritch et al. | |
| 5,744,811 A * | 4/1998 | Schonberg et al. | 204/157.44 |
| 5,783,900 A * | 7/1998 | Humphries et al. | 313/420 |
| 6,345,497 B1 * | 2/2002 | Penetrante | 422/186.04 |
| 6,878,349 B2 * | 4/2005 | Bianco et al. | 422/186.04 |
| 7,547,892 B2 * | 6/2009 | Avnery | 204/158.2 |
| 7,989,987 B2 * | 8/2011 | McDonald | 307/108 |
| 2005/0184257 A1 * | 8/2005 | Elsheref et al. | 250/492.22 |
| 2005/0199982 A1 * | 9/2005 | Friedman et al. | 257/603 |
| 2009/0188782 A1 * | 7/2009 | Genuario et al. | 204/157.3 |

OTHER PUBLICATIONS

Seino et al, "Characteristics of flue gas treatment by intense, pulsed, relativistic electron beam," Research Reports NIFS-PROC Series (2001), 50, pp. 74-79.*

Denisov et al, "Influence of the parameters of a pulsed electron beam on the removal of nitrogen oxides from flue gases," Technical Physics Letters vol. 24, No. 8, Aug. 1998 pp. 601-602.*

"Accelerators for Americas Future," Symposium Proceedings, Walter Henning and Charles Shank Chairs. Published by US Department of Energy, Jun. 2010.

R. Kikuchi and Y. Pelovski, "Low-dose irradiation by electron beam for the treatment of high-SOx flue gas on a semi-pilot scale—Consideration of by-product quality and approach to clean technology," Process Safety and Environment 87 (2009) 135-143.

S. Korenev and R. Johnson, "Electron accelerators for cleaning flue gases and for oil liquefaction," Proceedings of EPAC08, Genoa, Italy 2008. Paper TUPP141.

A.A. Basfar, O.I. Fageeha, N. Kunnummal, A.G. Chmielewski, J. Licki, A. Pawelec, Z. Zimek, and J. Warych, "A review on electron beam flue gas treatment (EBFGT) as a multicomponent air pollution control technology," Nukleonika 2010; 55(3):271-277.

Y.K. Kwon and D.H. Han, "Microwave Effect in the Simultaneous Removal of $NO_x$ and $SO_2$ under Electron Beam Irradiation and Kinetic Investigation of $NO_x$ Removal Rate," Ind. Eng. Chem. Res., 2010,49 (17), pp. 8147-8156.

J.D. Sethian, M. Myers, Ian D. Smith, V. Carboni, J. Kishi, D. Morton, J. Pearce, B. Bowen, L. Schlitt, O. Barr, and W. Webster, "Pulsed Power For A Rep-Rate, Electron Beam Pumped, Krf Laser," IEEE Trans Plasma Sci., 28, 1333 (2000).

F. Hegeler, M.W. McGeoch, J. D. Sethian, H. D. Sanders, S.C. Glidden, M.C. Myers, Durable, Gigawatt Class Solid State Pulsed Power System, IEEE Transactions on Dielectrics and Electrical Insulation, vol. 18, Issue 4, pp. 1205-1213, Aug. 2011.

J.K.Kim, B.Han, Y.R.Kim, N. Doutzkinov, K. Nikolov, E-Beam Flue Gas Treatment Plant for "Sviloza Power Station" "in Bulgaria—Engineering Consideration & Cost Evaluation," International Topical Meeting on Nuclear Research Applications and Utilization of Accelerators May 4-8, 2009, Vienna, Austria.

F. Hegeler, D.V. Rose M.C. Meyers, J.D. Sethian, J.L. Giulilani, M.F. Wolford, and M. Friedman, "Efficient electron beam deposition in the gas cell of the Electra laser," Physics of Plasmas, vol. 11, No. 11, pp. 5010-5021 (2004).

* cited by examiner

CATALYST-FREE REMOVAL OF $NO_x$ FROM COMBUSTION EXHAUSTS USING INTENSE PULSED ELECTRON BEAMS

CROSS-REFERENCE

This application is a Nonprovisional of and claims the benefit of priority under 35 U.S.C. §119 based on U.S. Provisional Patent Application No. 61/570,869 filed on Dec. 15, 2011, the entirety of which is hereby incorporated by reference into the present application.

TECHNICAL FIELD

The present invention relates to removal of $NO_x$ from the exhaust gas produced by combustion-based energy sources such as coal-fired power plants, oil-fired power plants, gas turbines, diesel internal combustion engines, and gasoline-based internal combustion engines.

BACKGROUND

Nitrogen oxides ($NO_x$) are a combination of nitric oxide (NO) and nitrogen dioxide ($NO_2$) and are a natural byproduct in the combustion of all fossil fuels. $NO_x$ is formed when the nitrogen in the air chemically interacts with oxygen released by the combustion process.

$NO_x$ has several deleterious effects. In either its pure chemical or particulate form, $NO_x$ is known to present a severe health hazard to the respiratory system. In addition, $NO_x$ is the basis for acid rain, which can affect the quality of air, soil, and water and can chemically decompose man-made structures including roads, bridges and buildings.

High voltage electron beams (500,000 to 1,000,000 Volts) have been demonstrated to remove up to 90% of the $NO_x$ emissions from a coal fired power plant. See "Accelerators for Americas Future," Symposium Proceedings, Walter Henning and Charles Shank Chairs. Published by US Department of Energy, June 2010.

The process for removing $NO_x$ from exhaust gas with electron beams, also called "flue gas", has been established using a catalytic process in which ammonia and water are injected into the flue gas before the gas is irradiated by a continuous electron beam. The electron beam dissociates the water molecules into free radicals, which then reacts with the $NO_x$ to produce nitric acid. The acid is neutralized by the ammonia to produce ammonium nitrate [$NH_4NO_3$], which can be used as a fertilizer. See R. Kikuchi and Y. Pelovski, "Low-dose irradiation by electron beam for the treatment of high-SOx flue gas on a semi-pilot scale—Consideration of by-product quality and approach to clean technology," *Process Safety and Environment* 87 (2009) 135-143; see also U.S. Pat. No. 5,695,616 to Helfrich et al.

This catalytic process has been demonstrated in pilot coal plants in the US, Japan, Germany, Poland, China, and Russia, see S. Korenev and R. Johnson, "Electron accelerators for cleaning flue gases and for oil liquefaction," Proceedings of EPAC08, Genoa, Italy 2008. Paper TUPP141, as well as on oil based plants, see A. A. Basfar, O. I. Fageeha, N. Kunnummal, A. G. Chmielewski, J. Licki, A. Pawelec, Z. Zimek, and J. Warych, "A review on electron beam flue gas treatment (EBFGT) as a multicomponent air pollution control technology," NUKLEONIKA 2010; 55(3):271-277.

However, this method has not been widely adopted, because the cost of fielding the continuous electron beam source can make the process prohibitively expensive, and the need to add ammonia to the flue gas, to remove the fertilizer by-product, and to find a practical use for the fertilizer by-product produced can make the process unduly cumbersome.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a process and apparatus for removing $NO_x$ from exhaust gases produced by combustion-based energy sources such as coal-fired power plants, oil-fired power plants, gas turbines, diesel internal combustion engines, and gasoline-based internal combustion engines.

In accordance with the present invention, an array of high voltage pulsed electron beams are repetitively generated and transported through a thin foil into an exhaust gas containing $NO_x$. Typical parameters of each electron beam are: voltage: 500,000 to 1,000,000 Volts; current: 100,000 to 500,000 Amperes; pulse length: 140-300 nanoseconds; and repetition rate: 5 to 20 pulses per second. The electron beam deposits its energy into the gas and produces reactive radicals $N_2^+$, $N^+$, e, $N_2$ from the $NO_x$ in the gas. These radicals recombine through chemical reactions to produce benign by-products nitrogen $N_2$ and oxygen $O_2$ which are output into the atmosphere.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides an apparatus and process for removing $NO_x$ from exhaust gases, also sometimes called "flue gases" herein, produced by combustion-based energy sources such as coal-fired power plants, oil-fired power plants, gas turbines, diesel internal combustion engines, and gasoline-based internal combustion engines.

Figure 1:
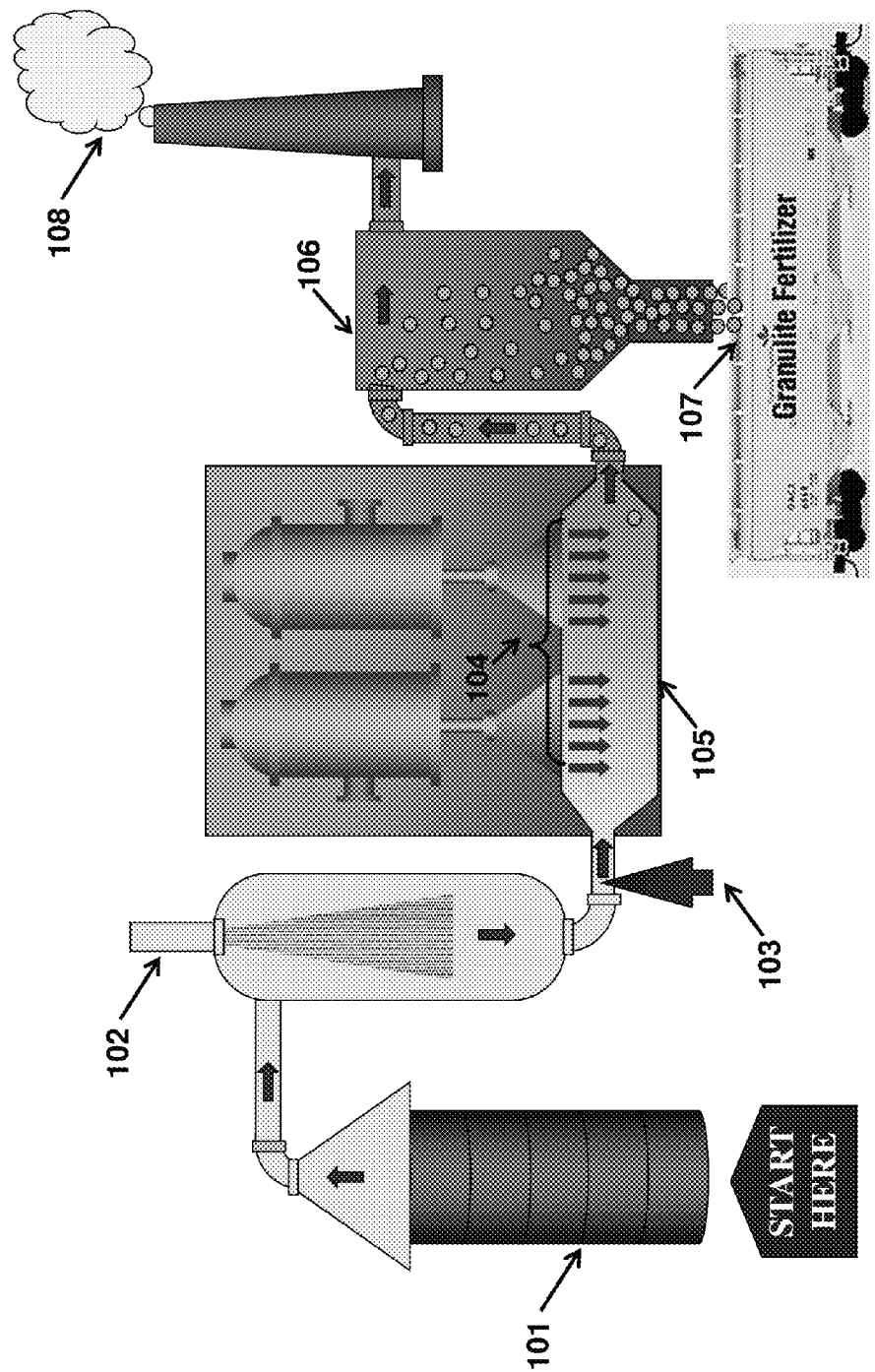
FIG. 1 is a block diagram depicting aspects of an exemplary apparatus for removal of $NO_x$ from combustion exhaust using a continuous electron beam and an ammonia catalyst in accordance with the prior art.

As noted above, conventional processes for using electron beams to remove $NO_x$ from combustion exhausts required the use of continuous electron beams and the addition of ammonia as a catalyst in the process. FIG. 1 illustrates an exemplary apparatus used in such a conventional process in accordance with the prior art. As shown in FIG. 1, in the conventional system, exhaust gases from a combustion process are travel through a flue 101, past water source 102, which adds water to the exhaust, and ammonia source 103, which adds ammonia to the exhaust, and into reaction chamber 105. Once in the reaction chamber, the combined exhaust, water, and ammonia, are irradiated with electron beams 104. As a result of the electron beam irradiation, the water molecules are dissociated into free radicals, i.e., molecules with unpaired electrons that are highly reactive chemically. The free radicals then react with the $NO_x$ in a reaction chamber 106 to produce nitric acid $HNO_3$, which is neutralized by the ammonia $NH_3$ to produce ammonium nitrate $NH_4NO_3$. The ammonium nitrate is output as a by-product 107 which can be used as a fertilizer, with the scrubbed exhaust gas 108 being output into the atmosphere.

The present invention provides a significant improvement over the prior art process for removing $NO_x$ from exhaust gases. As described in more detail below, the present invention provides an apparatus and a process for removing $NO_x$ from exhaust gases that uses pulsed electron beams and does not require a catalyst or removal of catalyst-produced by-products. In addition, the system has been proven to be more efficient at removing $NO_x$, so less powerful systems can be used to produce pulsed beams, and so the process in accordance with the present invention is also inherently less expensive than the prior art process which requires a continuous electron beam.

Figure 2:
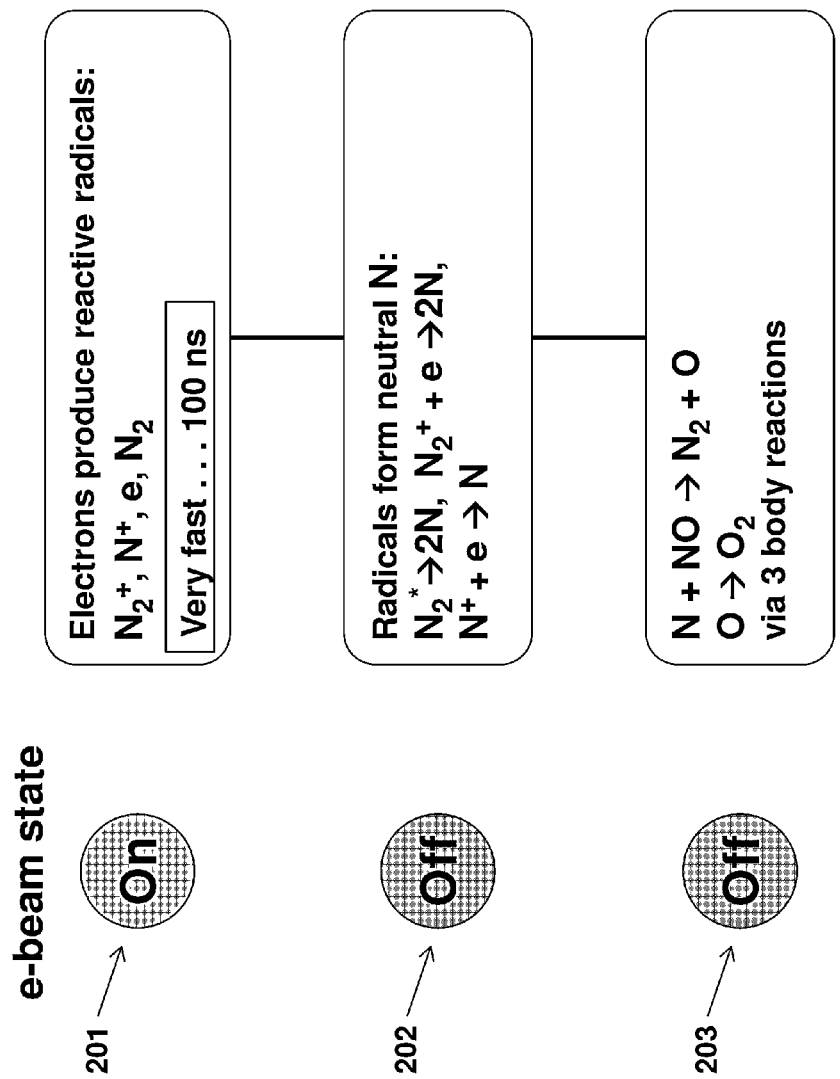
FIG. 2 is a block diagram depicting aspects of a process for catalyst-free removal of $NO_x$ from combustion exhaust using pulsed electron beams in accordance with the present invention.
Figure 3:
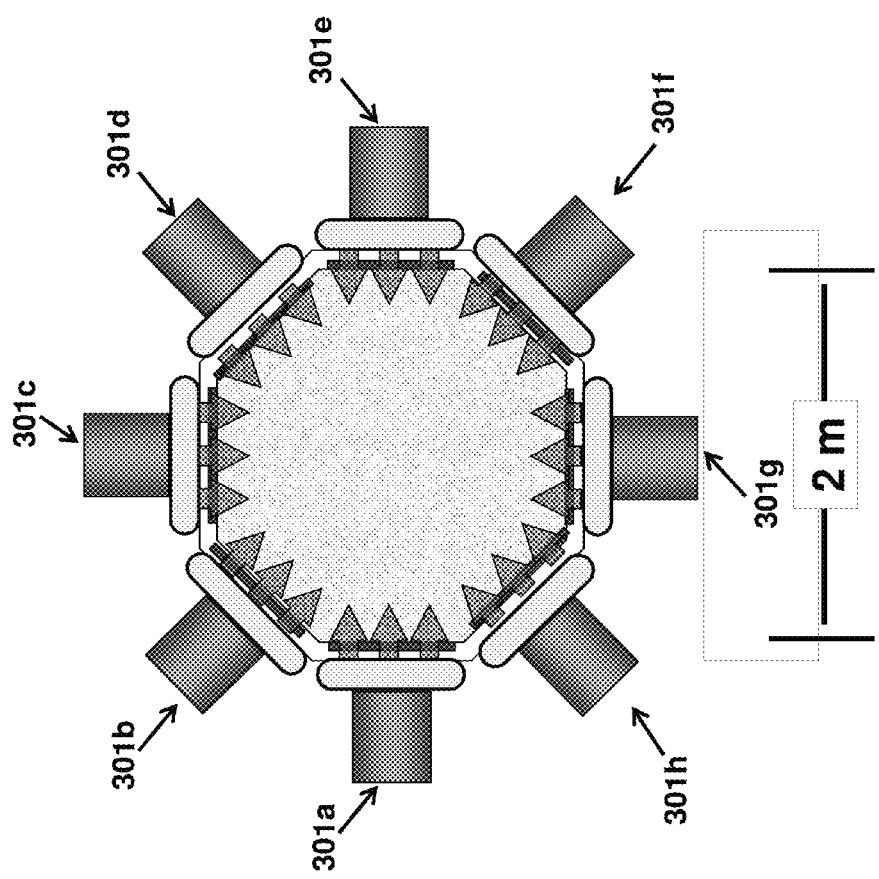
FIG. 3 is a block diagram depicting aspects of an exemplary configuration of an apparatus for catalyst-free removal of $NO_x$ from combustion exhaust using pulsed electron beams in accordance with the present invention.
Figure 4:
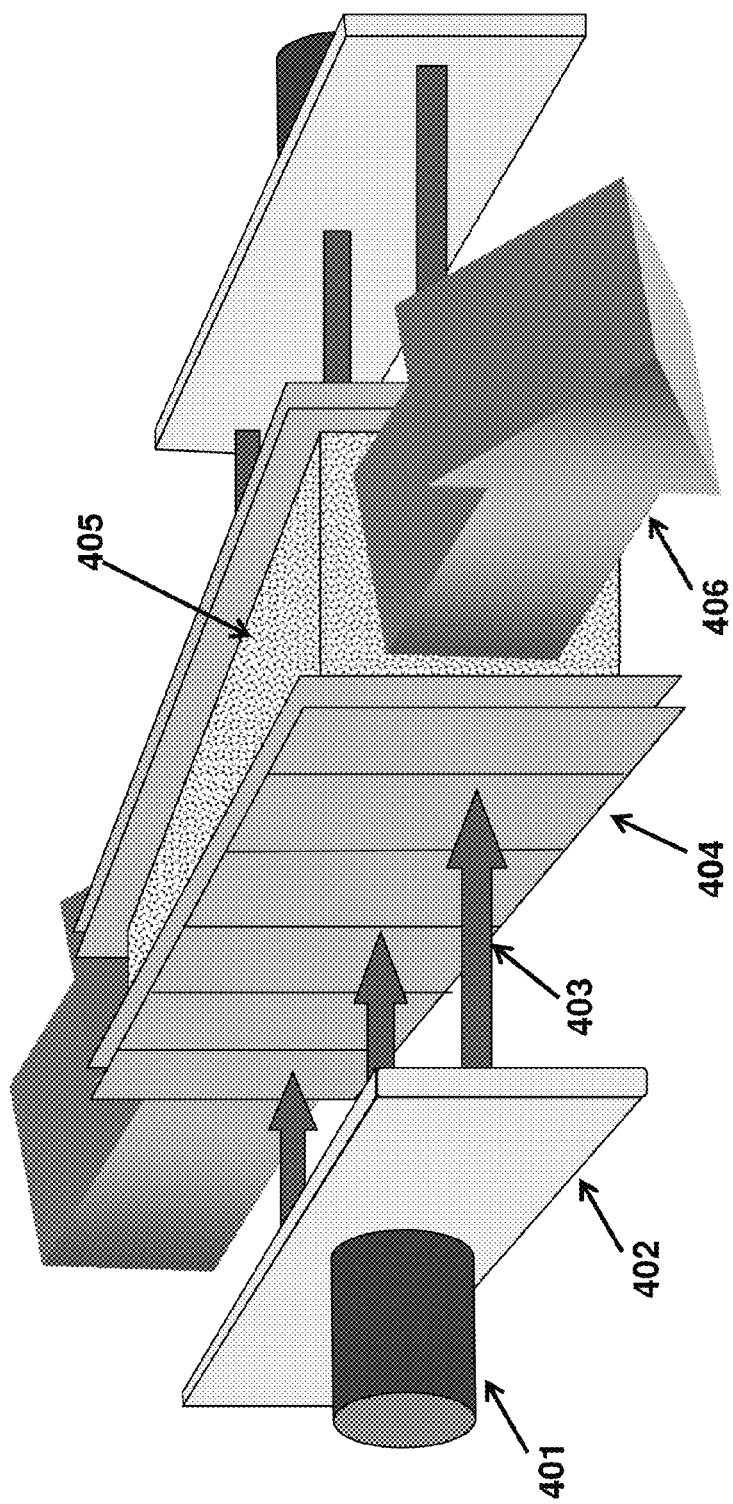
FIG. 4 is a block diagram depicting further aspects of an exemplary configuration of an apparatus for catalyst-free removal of $NO_x$ from combustion exhaust using pulsed electron beams in accordance with the present invention.

Thus, as illustrated in FIGS. 2-4, in accordance with the present invention, an array of high voltage pulsed electron beams are repetitively generated and transported through a thin foil into the exhaust gas containing $NO_x$. Typical parameters of each electron beam are: voltage: 500,000 to 1,000,000 Volts; current: 100,000 to 500,000 Amperes; pulse length: 140-300 nanoseconds; and repetition rate: 5 to 20 pulses per second. The electron beam deposits its energy into the gas, and this energy produces reactive radicals from the $NO_x$ in the gas. The radicals then recombine through chemical reactions to produce benign by-products nitrogen $N_2$ and oxygen $O_2$.

The flow chart in FIG. 2 illustrates aspects of a process for removing $NO_x$ from exhaust gases in accordance with the present invention. As illustrated in FIG. 2, the process in accordance with the present invention utilizes a pulsed electron beam which is "on" at some stages of the process and "off" at others. A pulsed source is projected to be up to five times more efficient for flue gas cleanup, in that it reduces the residual $NO_x$ concentration by five times more than with a conventional continuous electron beam, because it turns "off" after the free radicals are formed, and so does not interfere with the subsequent reactions in the process.

Thus, as illustrated in FIG. 2, at step 201, the electron beam is turned on and is directed through the flue gas in a reaction chamber. The pulse is very fast, on the order of 100 ns. The beam is then off for 50 to 200 msec, and then on again. The actual off period can be adjusted to meet the particular system requirements, i.e. flue gas flow rate. Electrons from the electron beam travel into the reaction chamber and transfer their energy into the gas, causing the formation of reactive radicals $N_2^+$, $N^+$, e, $N_2$. At step 202, the pulsed beam is turned off, at the radicals combine to form neutral nitrogen N through the reactions $N_2^* \rightarrow 2N$, $N_2^+ + e \rightarrow 2N$, and $N^+ + e \rightarrow N$. In step 203, the pulsed beam remains off, and the nitrogen N and nitric oxide NO from the $NO_x$ combine to form nitrogen and oxygen in a three-body reaction, where $N + NO \rightarrow N_2 + O$ and $O \rightarrow O_2$. The nitrogen $N_2$ and oxygen $O_2$ are then output into the atmosphere as harmless components of the scrubbed exhaust.

Exemplary apparatus configurations that can be used in such a process are illustrated in FIGS. 3 and 4.

As shown in FIGS. 3 and 4, a plurality of electron beam sources can be arranged around a reaction vessel through which flue gas passes. In some embodiments, such as that shown in FIG. 3, electron beam sources 301a-301h can be arranged in an approximately circular array around a cylindrical reaction vessel, though other configurations, such as the one shown in FIG. 4, in which electron beam sources 401a and 401b are situated on opposite sides of an oblong reaction vessel, are possible.

FIG. 4 illustrates an exemplary apparatus configuration in accordance with the present invention in more detail. As can be seen in FIG. 4, the apparatus includes a high voltage pulsed power source 401 configured to drive the electron beams into the flue gas. In an exemplary embodiment, the high voltage to drive the electron beams is created by an all solid-state system that includes a Marx Generator made from solid-state thyristors and thin film capacitors, a saturable magnetic inductor output switch, and one or more pulse forming lines, though any other appropriate power source can also be used. Electron beam 403 is generated by applying this high voltage to a large area emitter (cathode) 402 which produces the electron beam by field emission and/or plasma formation. Typical cathode dimensions range from 20 cm by 100 cm to 60 cm×200 cm. Any appropriate cathode can be used, though it is typically not a thermionic cathode that requires high temperatures or control grids. In an exemplary embodiment, the cathode is made of an array of straight carbon or polymer fibers, 2-6 mm in length, that have been bonded to a conducting base.

The electron beam 403 is accelerated through a thin metal foil 404 into the flue gas 406 which flows through a reaction chamber 405. Foil 404 can be made of stainless steel, titanium, or a titanium alloy, and may have a thin coating to prevent chemical interaction with the flue gas 406. The foil can be held in place by any appropriate means, such as by an array of support ribs. To maximize efficiency, the electron beam may be emitted in strips that propagate between the ribs. In a preferred embodiment, the electron beam is configured in four to eight separate panels in a circular array to uniformly irradiate the flue gas in the reaction chamber from all sides.

Typical electron beam parameters are as noted above, though as described below, one or more can be adjusted as appropriate:

Voltage: adjusted so the electrons are stopped just before reaching the opposite wall of the chamber;

Pulse length: Long enough to produce the free radicals, but short enough to not interfere with subsequent reactions;

Current: Adjusted so beam has enough total energy to create the free radicals; and Pulse Repetition Rate: Fast enough to fully expose all of the flowing gas.

The principle of the present invention has been demonstrated by the inventors in a series of experiments at the Naval Research Laboratory (NRL) between Sep. 6 and 9, 2011, and the results are set forth in Table I below:

TABLE I

| Initial $NO_x$ (ppm) | Final $NO_x$ (ppm) | Ammonia Added? | Removal Efficiency | Total electron beam deposition (J/cc) | Beam Type |
|---|---|---|---|---|---|
| 500 | 50 | YES | 90% | 0.05 | Continuous |
| 200 | 4.2 | NO | 96% | 0.09 | Pulsed |
| 500 | 9.9 | NO | 98% | 0.07 | Pulsed |
| 980 | 44 | NO | 96% | 0.09 | Pulsed |

The data for the continuous beam is from Y. K. Kwon and D. H. Han, "Microwave Effect in the Simultaneous Removal of $NO_x$ and $SO_2$ under Electron Beam Irradiation and Kinetic Investigation of $NO_x$ Removal Rate," *Ind. Eng. Chem. Res.*, 2010, 49 (17), pp. 8147-8156, while the data for the pulsed beam is from experiments by the inventors using the Electra electron beam at NRL.

As can readily be seen from Table I, the pulsed electron beam removes five times as much of the $NO_x$, and without the need for a catalyst.

Experimentally, the continuous electron beam process appears to have a saturation limit, i.e., increasing the energy deposition above a certain point does not decrease the $NO_x$ concentration. In contrast, use of a pulsed electron beam in accordance with the present invention has no limit, so that increasing the energy deposition keeps decreasing the $NO_x$ concentration.

Thus, in accordance with the present invention, $NO_x$ can be easily and efficiently removed from flue gases using pulsed electron beams. There are two distinct advantages and new features to the invention. One advantage is that it uses pulsed electron beam sources, which are much more efficient and inexpensive. A second advantage is that the process of the present invention does not require ammonia or any other substance as a catalyst, which simplifies both the inputs into the system and the output since the by-products of the present process are simply oxygen and nitrogen output into the atmosphere.

Although particular embodiments, aspects, and features have been described and illustrated, it should be noted that the invention described herein is not limited to only those embodiments, aspects, and features, and it should be readily appreciated that modifications may be made by persons skilled in the art.

For example, the cathode (electron beam) emitter may vary. In addition, the pulsed power can be based on spark gap switches, as in present Electra System developed at NRL, (see J. D. Sethian, M. Myers, Ian D. Smith, V. Carboni, J. Kishi, D. Morton, J. Pearce, B. Bowen, L. Schlitt, O. Barr, and W. Webster, "Pulsed Power For A Rep-Rate, Electron Beam Pumped, Krf Laser," *IEEE Trans Plasma Sci.*, 28, 1333 (2000)), or it can be based on an all solid state system, as also developed by NRL (see F. Hegeler, M. W. McGeoch, J. D. Sethian, H. D. Sanders, S. C. Glidden, M. C. Myers, Durable, Gigawatt Class Solid State Pulsed Power System, IEEE Transactions on Dielectrics and Electrical Insulation, Vol. 18, Issue 4, pp. 1205-1213, August 2011.)

The present application contemplates these and any and all modifications within the spirit and scope of the underlying invention described and claimed herein, and all such embodiments are within the scope and spirit of the present disclosure.

What is claimed is:

1. A process for catalyst-free removal of $NO_x$ from combustion exhaust, comprising:
    irradiating a combustion exhaust containing $NO_x$ with a pulsed electron beam from a pulsed electron beam source as the combustion exhaust travels through a reaction chamber to form a scrubbed exhaust, the combustion exhaust being free from ammonia or any other added catalyst,
    wherein the pulsed electron beam is turned on for about 100 to about 300 ns to deposit its energy into the combustion exhaust and then is turned off for about 50 to about 200 msec, the energy from the pulsed electron beam causing the $NO_x$ to dissociate into reactive radicals $N_2^+$, $N^+$, e, and $N_2$ during a period when the pulsed electron beam is turned on, the reactive radicals $N_2^+$, $N^+$, e, and $N_2$ combining to form neutral nitrogen $N_2$ and $O_2$ by the reactions $N_2^* \rightarrow 2N$, $N_2^+ + e \rightarrow 2N$, $N^+ + e \rightarrow N$, $N + NO \rightarrow N_2 + O$, and $O \rightarrow O_2$ during the period when the electron beam is turned off, the reactions proceeding without any catalyst being added to the exhaust, and the reactions producing only the $N_2$ and $O_2$ and not producing any other by-products; and
    releasing the $N_2$ and the $O_2$ as the scrubbed exhaust into the atmosphere.

2. The process according to claim 1, wherein the pulsed electron beam source has a voltage of about 500,000 to about 1,000,000 Volts.

3. The process according to claim 1, wherein the pulsed electron beam source provides a current of about 100,000 to about 500,000 Amperes to the exhaust gas.

4. The process according to claim 1, wherein the combustion exhaust is irradiated by a plurality of pulsed electron beams from a plurality of electron beam sources arranged around the combustion chamber.

5. An apparatus for the catalyst-free removal of $NO_x$ from combustion exhaust, comprising:
    at least one pulsed power electron beam source configured to produce a pulsed electron beam directed at a flow of combustion exhaust containing $NO_x$, the electron beam source comprising:
        a voltage source configured to produce a voltage of about 500,000 to about 1,000,000 volts to drive the pulsed electron beam through the combustion exhaust; and
        a cathode configured to be powered by the voltage source, the cathode comprising a non-thermionic cathode not requiring high temperatures for the production of the electron beam and being configured to produce the electron beam by at least one of field emission and plasma formation;
    a reaction chamber configured to receive, at a first end thereof, a flow of the combustion exhaust, wherein the combustion exhaust does not contain any added catalyst, and to output a output a scrubbed exhaust directly into the atmosphere at a second end thereof without any further processing; and
    a thin metal foil situated between the electron beam source and the combustion exhaust;
    wherein the pulsed electron beam from the at least one pulsed electron beam source travels through the thin metal foil and into the combustion exhaust, the electron beam depositing its energy into the combustion exhaust as it travels through the reaction chamber;
    wherein the pulsed electron beam is turned on for about 100 to about 300 ns, and is then turned off for a period of about 50 to about 200 msec, the energy from the electron beam causing the $NO_x$ to dissociate into reactive radicals $N_2^+$, $N^+$, e, and $N_2$ during the period when the electron beam is turned on, and the reactive radicals $N_2^+$, $N^+$, e, and $N_2$ combining to form neutral nitrogen $N_2$ and $O_2$ by the reactions $N_2^* \rightarrow 2N$, $N_2^+ + e \rightarrow 2N$, $N^+ + e \rightarrow N$, $N+NO \rightarrow N_2+O$, and $O \rightarrow O_2$ during the period when the electron beam is turned off, wherein the reactions proceed without any catalyst; and wherein the resulting $N_2$ and $O_2$ are output as the scrubbed exhaust directly from the reaction chamber into the atmosphere.

6. The apparatus according to claim 5, wherein the high voltage pulsed power supply comprises a Marx Generator.

7. The apparatus according to claim 6, wherein the Marx Generator is made from solid-state thyristors and thin film capacitors, a saturable magnetic inductor output switch, and at least one pulse forming line.

8. The apparatus according to claim 5, wherein the cathode comprises a large area cathode having a width of about 20 to 60 cm and a length of about 100 to 200 cm.

9. The apparatus according to claim 5, wherein the cathode comprises an array of straight carbon or polymer fibers bonded to a conducting base, the fibers having a length of about 2 to about 6 mm.

10. The apparatus according to claim 5, wherein the cathode is configured to produce the electron beam by one of field emission and plasma formation.

11. The apparatus according to claim 5, wherein the thin metal foil comprises stainless steel, titanium, or a titanium alloy.

12. The apparatus according to claim 5, wherein the thin metal foil has a thin coating to prevent a chemical interaction between the metal foil and the exhaust gas.

13. The apparatus according to claim 5, wherein the apparatus comprises a plurality of electron beam sources arranged around the reaction chamber, each of the plurality of electron beam sources being configured to simultaneously apply a corresponding pulsed electron beam to the exhaust gas as it travels through the reaction chamber.

14. The apparatus according to claim 5, wherein the thin metal foil is held in place by an array of support ribs, and wherein the electron beam source is configured to emit the electron beam so that it propagates between the support ribs.

* * * * *